United States Patent [19]
Paez

[11] Patent Number: 4,549,685
[45] Date of Patent: Oct. 29, 1985

[54] METHOD FOR SUPERPLASTIC FORMING AND DIFFUSION BONDING Y SHAPED SUPPORT STRUCTURES

[75] Inventor: Carlos A. Paez, Huntington, N.Y.

[73] Assignee: Grumman Aerospace Corporation, Bethpage, N.Y.

[21] Appl. No.: 578,597

[22] Filed: Feb. 10, 1984

Related U.S. Application Data

[63] Continuation of Ser. No. 285,015, Jul. 20, 1981.

[51] Int. Cl.⁴ .................. B23K 20/18; B21D 26/02
[52] U.S. Cl. ............................... 228/118; 228/157; 228/161; 228/193; 428/595
[58] Field of Search ............ 228/157, 118, 193, 160, 228/161; 428/595

[56] References Cited

U.S. PATENT DOCUMENTS

| | | | |
|---|---|---|---|
| 3,111,747 | 11/1963 | Johnson | 29/157.3 |
| 3,834,000 | 9/1974 | Miller | 228/118 |
| 3,920,175 | 11/1975 | Hamilton et al. | 228/173 |
| 3,927,817 | 12/1975 | Hamilton et al. | 228/157 |
| 3,934,441 | 1/1976 | Hamilton et al. | 72/60 |
| 4,117,970 | 10/1978 | Hamilton et al. | 228/173 |
| 4,294,419 | 10/1981 | Fouse | 228/157 |
| 4,304,821 | 12/1981 | Hayase | 228/157 |
| 4,351,470 | 9/1982 | Swadling | 228/157 |
| 4,361,262 | 11/1982 | Israeli | 228/157 |

OTHER PUBLICATIONS

*Superplastic Forming/Diffusion Bonding*, Aug. 1978, NA-77-902, Rockwell Int'l.

Uberbacher, *Superplastic Tools and Materials*, IBM Technical Disc., vol. 11, No. 11, Apr. 1969, p. 1414.

*Primary Examiner*—Kenneth J. Ramsey
*Attorney, Agent, or Firm*—Morgan, Finnegan, Pine, Foley & Lee

[57] ABSTRACT

A method of forming Y shaped support structures by diffusion bonding and/or superplastic forming wherein layers of metal capable of diffusion bonding and/or superplastic forming are placed in a sandwich-like assembly having a top, bottom and intermediate layers, the layers having been selectively coated with stop-off. The sandwich assembly is subjected to sufficient pressure and heat to diffusion bond and superplastically form the sandwich assembly into a Y shaped stringer or support structure. The layers and/or a reinforcing member are selectively coated with stop-off so as to form at least two Y shaped support structures.

6 Claims, 6 Drawing Figures

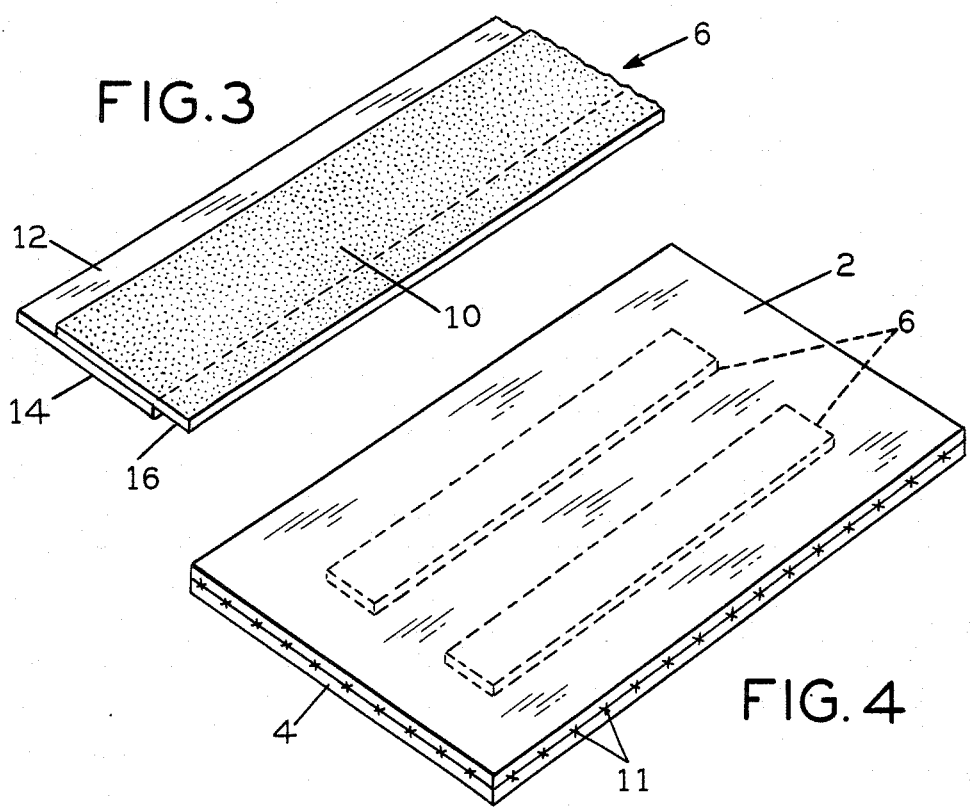
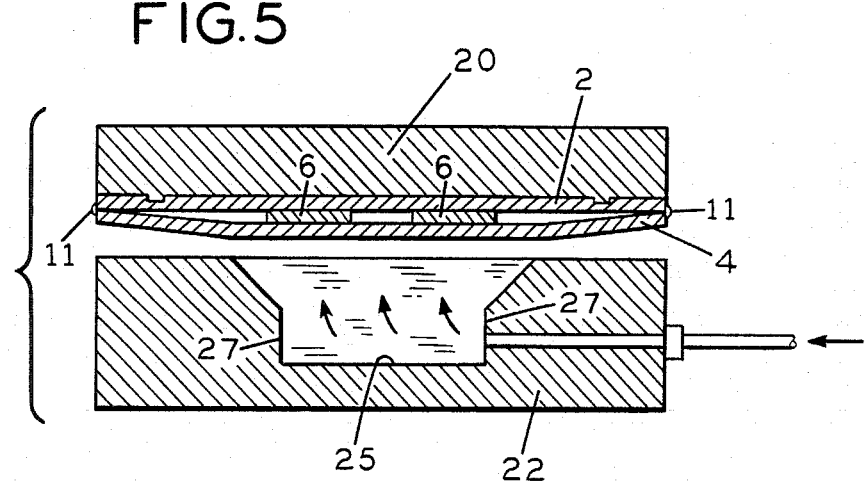
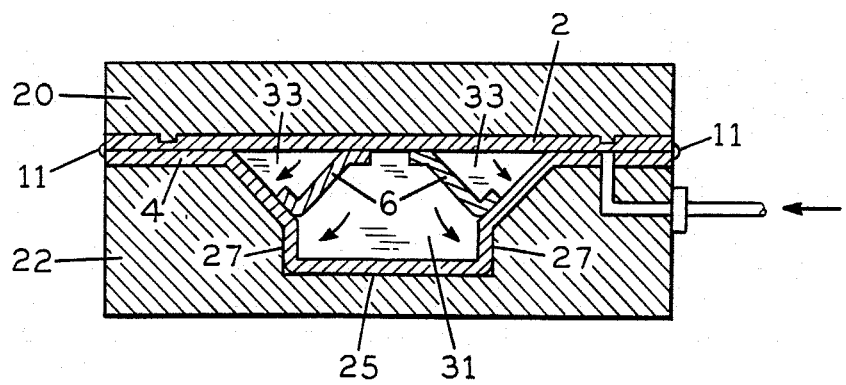

METHOD FOR SUPERPLASTIC FORMING AND DIFFUSION BONDING Y SHAPED SUPPORT STRUCTURES

The Government has rights in this invention pursuant to Contracts Nos. F 33615-78-C-3215 awarded by the Department of the Air Force.

This is a continuation of application Ser. No. 285,015 filed July 20, 1981.

BACKGROUND OF INVENTION

This invention relates to methods for superplastic forming and diffusion bonding continuous structures and more particularly to methods of superplastic forming and diffusion bonding of Y shaped support structures called Y stringers in a simple manner which avoids lines or zones of weakness.

The process of superplastic forming and diffusion bonding is well known in the art. The process has the advantages of forming complex shapes and permitting deep drawing of metallic parts. At the temperatures involved the deformation stresses are relatively low, which permits the forming of complex parts under pressures which keep tool deformation and wear at a minimum.

Diffusion bonding which is used in conjunction with superplastic forming refers to the metallurgical bonding or joining of metal by the steps of applying heat and pressure for periods of time sufficient to cause co-mingling of the metal atoms at the places where the surfaces are joined.

Generally speaking, the process begins with cleaning the metal sheets to be used in a face-to-face or sandwich type construction. The sheets are then selectively and judiciously coated with a material commonly referred to as "stop-off" which typically is boron-nitride, yttria or some rare earth or other very inert material. The purpose of the "stop-off" is to prevent diffusion bonding of the sandwich-like material where the stop-off material has been applied. The areas coated with "stop-off" can be superplastically formed into a desired shape by the application of gas pressure applied to the inside of the metallic sandwich.

The superplastic forming and diffusion bonding process provides many manufacturing and structural advantages over more conventional manufacturing processes and is particularly useful in the formation of a variety of intricately-shaped structures including the deep drawing of parts. In the aero-space industry the process is used for forming frames, bulkheads and air passage panels. In the formation of such structures, stiffening elements are provided for strength purposes. The larger of such stiffening elements are sometimes called "frames". Typically, there is another stiffening element cross-wise, e.g., perpendicular to the frame sometimes referred to as "stringers".

This invention relates to a method of forming a relatively flat plate and a Y shaped element depending therefrom called a Y stringer.

In the past the Y stringers have been formed by joining two separate pieces by fastener elements. The Y in turn is joined to the plate member by additional fasteners.

Another proposed solution is to extrude the Y shaped support member and attach it in a conventional manner such as by rivets to the plate member. This proposal requires forming holes for the rivets and the rivets themselves. Conventional extrusion techniques also limit the shape of the parts that can be made.

OBJECTS OF THE INVENTION

With the foregoing in mind, it is an object of this invention to provide a method for forming Y shaped supporting members by diffusion bonding and superplastic forming.

Another object of this invention is to provide a new and improved method of forming reinforcing strengthening members by forming a sandwich of a top layer, bottom layer which has been selectively coated with stop-off and then subjected to diffusion bonding and superplastic forming.

A still further object of this invention is to provide in a superplastic forming and diffusion bonding process reinforcing strips which are selectively positioned and selectively coated with stop-off so as to selectively strengthen stiffening members.

Another object of the invention is to provide in a superplastic forming and diffusion bonding process a step which includes applying a pattern of stop-off to a pair of intermediate sheets placed between a top and bottom layer in a sandwich form so as to form Y shaped strengthening members by diffusion bonding and superplastic forming.

A still further object is to provide in a diffusion bonding superplastic forming process a sandwich like structure including layers selectively coated with stop-off and selectively diffusion bonded so as to form Y shaped strengthening members.

Additional objects and advantages of the invention will be set forth in the description which follows and, in part, will be obvious from the description, the objects and advantages being realized and obtained by means of the parts, instrumentation, methods, apparatus and procedures particularly pointed out in the appended claims.

BRIEF DESCRIPTION OF THE INVENTION

Briefly described, the invention relates to a method of forming a pair of Y shaped stringer plates, although any number could be formed and the invention is not limited to two such stringers.

The process of this invention includes the selection of a top and bottom plate which have been sheared or cut to the appropriate shape and size.

The intermediate plates from which the Y shaped stringers are formed are sheared to the desired size and configuration.

The top and bottom plates and the intermediate Y stringer plates are then cleaned and selectively coated with stop-off to control the pattern of diffusion bonding and superplastic forming.

The assembled sandwich is then placed between an upper and lower die and subjected to predetermined pressure and a predetermined temperature so as to cause diffusion bonding of the uncoated areas of the sandwich and subject to internal argon gas pressure to cause superplastic deformation of the coated portions.

Following this deformation step, the diffusion bonded and deformed sandwich has excess material removed such as by cutting with shears or the like in order to complete the formation of the Y shaped stringer.

The invention consists of the novel steps, constructions and improvements shown and described.

The accompanying drawings which are incorporated in and constitute part of this specification illustrate an embodiment of the invention and together with the description serve to explain the principles of the invention.

OF THE DRAWINGS

FIG. 3 is a perspective view of one of the intermediate sheets with the stop-off illustrated as an exaggerated layer for illustrative purposes.

FIG. 4 is a perspective view of the sandwich assembly.

FIG. 5 is a view showing the diffusion bonding step.

FIG. 6 is a view showing the superplastic forming step.

DETAILED DESCRIPTION OF THE INVENTION

Figure 1:
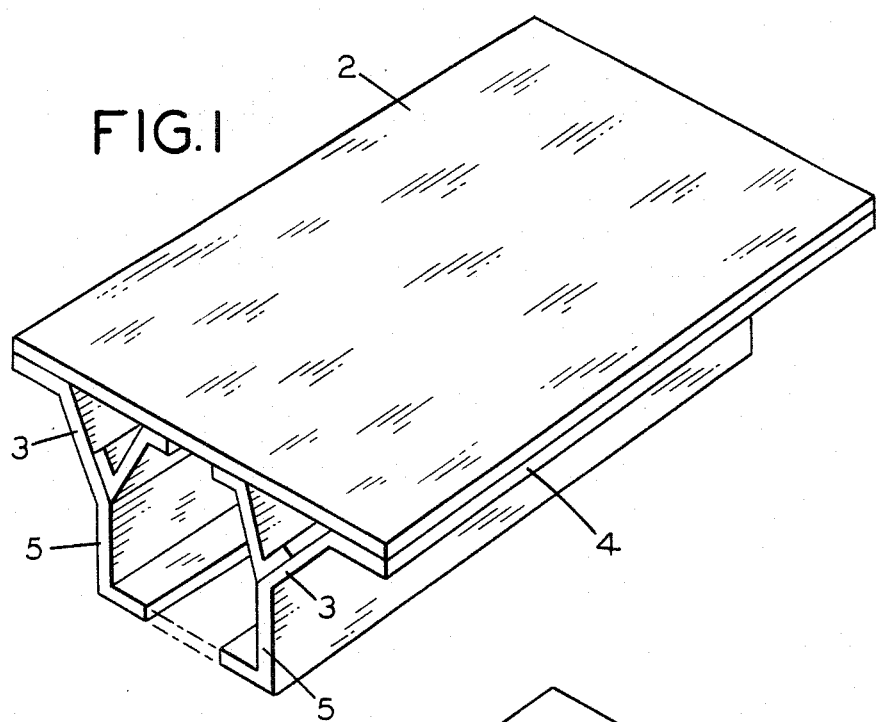
FIG. 1 is a perspective view of a Y stringer formed by the invention.

Referring to FIG. 1, there is illustrated a Y stringer made in accordance with the invention. It consists of a support plate 1 made of two diffusion bonded layers, a long leg 3 of the Y and a short leg 5 of the Y.

Figure 2:
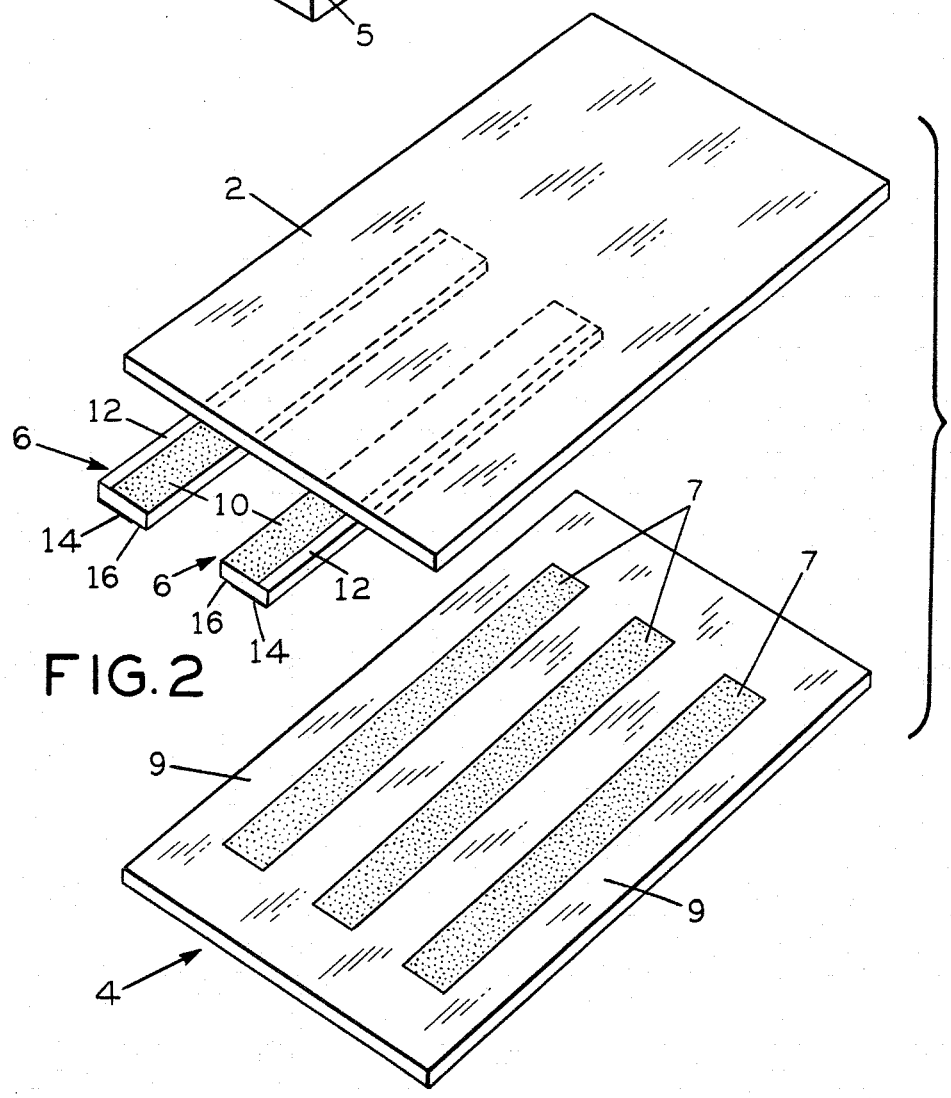
FIG. 2 is an exploded perspective view of the sandwich construction before assembly.

In FIG. 2 there is shown a top plate 2 and a bottom plate 4 each of which has been sheared or cut to the appropriate size.

Adapted to be placed between the top plate 2 and bottom plate are a pair of intermediate plates 6 which are used in the formation of the Y stringers.

Preferably, the top plate 2, bottom plate 4, and intermediate plates 6 are made of titanium or titanium alloys; but in practice they can be made of any material capable of being diffusion bonded and superplastically formed at appropriate temperatures and pressures. Such other metals may include aluminum and steel and/or alloys thereof and possibly others.

In accordance with this invention, the plates are selectively treated with stop-off so as to control the pattern of diffusion bonding. As indicated above, typically the material used for stop-off is boron-nitrate or yttria, but other materials are available.

As shown in FIGS. 2, the lower or bottom layer is coated with stop-off in three rectangular locations 7, one in the center of the sheet and two along the sides thereof. There are uncoated rectangular portions 9 between the coated portions and at the sides thereof.

The intermediate plates 6 are coated with the following pattern: The upper surface of the plate 6 is coated with stop-off over its entire surface except for a narrow strip 12 adjacent one edge of the plate 6. The bottom side of the plate is also coated 14 over its width except for a narrow strip 16 on the opposite side from the uncoated strip 12.

As shown, there are, of course, a pair of such intermediate plates each coated in the same manner.

The intermediate plates are placed between the top and bottom sheets in a predetermined position. Thus the intermediate plates 6 are positioned so that the uncoated portions 12 are located towards the outer of the top sheet spaced a predetermined distance away from one another. The uncoated bottom portions 12 of the intermediate plates 6 are positioned in registry with two inner uncoated portions 9 of the bottom sheet between the center and outer portions coated with stop-off.

After positioned where desired the intermediate plates are tack welded to hold them in position. The top and bottom plates are then positioned as shown in FIG. 4 and are peripherally seam welded 11 in conventional fashion to form a sandwich assembly.

The completed sandwich assembly is then placed between a top die 20 and a bottom die 22. The bottom die 22 has a cavity 24 having an appropriate shape. It includes a flat bottom surface 25, two vertical surfaces 27 and two inclined surfaces 29. The dies and the sandwich assembly are then heated to about 1650° F. and the gases between the sheets are evacuated. When the dies and the sandwich assembly are stabilized, the assembly is diffusion bonded by applying external argon gas into the cavity for a period of about two and one-half hours as illustrated in FIG. 5. This will cause diffusion bonding of those parts of the assembly which have not been coated with stop-off.

Following the diffusion bonding cycle argon gas is introduced between the sheets at a predetermined rate as illustrated in FIG. 6. As can be seen in FIG. 6, the internal gas pressure causes the center portion of the assembly to expand to the bottom of the mold cavity 24 to form a center expansion cavity 31. The side of the sandwich is formed into two triangular cavities 33.

The triangular cavities 33 and the center cavity 31 are separate by the intermediate plates 6. As a final step where necessary, the center bottom portion of the stringer is removed by routing, milling or the like, so that a Y shape remains.

What is claimed is:

1. A method of forming a Y shaped structural unit adapted for use in aircraft comprising:
    (a) selecting and sizing a top layer and a bottom layer of material of predetermined thickness adapted for diffusion bonding and superplastic forming:
    (b) selecting and sizing at least one separate intermediate plate of material of predetermined thickness adapted for diffusion bonding and superplastic forming, said at least one separate intermediate plate being substantially less in length and width than said top and bottom layers;
    (c) selectively coating said at least one separate intermediate plate and at least one of said top and bottom plates with stop-off so that a relatively small edge portion of said at least one intermediate plate can be diffusion bonded to said top and bottom layers;
    (d) assembling a sandwich unit of said top, said bottom and said at least one separate intermediate plate;
    (e) placing said sandwich unit between an upper and lower die, at least one of said dies including a cavity,
    (f) subjecting said sandwich unit to sufficient pressure and heat so as to diffusion bond those surfaces of said top, bottom and said at least one intermediate plate not coated with stop-off,
    (g) directing an inert gas under pressure between the layers of said sandwich so as to superplastically form the sandwich unit into cavities so that said at least one separate intermediate plate are diffusion bonded to said top and bottom layers to form a Y shaped structural unit having a substantially triangularly shaped space between portions of the upper and lower layers and the said at least one intermediate plate.

2. A method of forming a Y shaped structural unit adapted for use in aircraft utilizing diffusion bonding and superplastic forming comprising:

(a) selecting and sizing a top plate and a bottom plate and material of predetermined thickness capable of diffusion bonding and superplastic forming, (b) selecting and sizing at least two intermediate plates of predetermined thickness capable of diffusion bonding and superplastic forming, said intermediate plates being substantially less in width and length than said top and bottom layers, (c) applying stop-off to plurality of parallel rectangular sections of one surface of one of said top and bottom plates, (d) applying stop-off to all but a narrow portion adjacent one edge of the top surface of one of the other of said intermediate plates, (e) positioning said intermediate plates between the top and bottom plates so that the upper uncoated portions of the top surface of one of said intermediate plates can be diffusion bonded to an uncoated portion of the bottom surface of the top plate, and the uncoated portion of the bottom surface of the other of said intermediate plates can be diffusion bonded to an uncoated portion of the bottom plate, (f) forming an assembly sandwich unit of said top, intermediate and bottom plates, (g) placing the assembly sandwich unit between an upper die and a lower die at least one of said dies having a cavity therein, (h) subjecting the assembly sandwich unit to sufficient pressure and temperature so as to cause diffusion bonding of the uncoated portions of the top, intermediate and bottom plates, (i) directing gas under pressure between the top and bottom sheets to superplastically form a center cavity and two generally triangular cavities to thereby form a Y shaped structural unit having a substantially triangularly shaped space between portions of the upper and lower layers and the intermediate plates, (j) removing the diffusion bonded superplastically formed unit from the die.

3. A method as defined in claim 2 wherein
(a) a pair of intermediate plates are used.

4. A method as defined in claim 3 wherein at least one of said top and bottom plates is coated with stop-off in three parallel rectangular locations.

5. A method as defined in claim 4 wherein said intermediate plates are tack welded in the desired position.

6. A method as defined in claim 5 wherein said sandwich assembly is seam welded around its periphery.

* * * * *